J. E. PECKHAM.
SHANK STIFFENER.
APPLICATION FILED DEC. 1, 1916.

1,240,249. Patented Sept. 18, 1917.

Inventor.
Joseph E. Peckham
by Heard Smith & Tennant.
Attys.

UNITED STATES PATENT OFFICE.

JOSEPH E. PECKHAM, OF NEWTON HIGHLANDS, MASSACHUSETTS, ASSIGNOR TO J. E. PECKHAM CO., INC., OF BOSTON, MASSACHUSETTS, A CORPORATION OF MASSACHUSETTS.

SHANK-STIFFENER.

1,240,249.          Specification of Letters Patent.          Patented Sept. 18, 1917.

Application filed December 1, 1916. Serial No. 134,221.

*To all whom it may concern:*

Be it known that I, JOSEPH E. PECKHAM, a citizen of the United States, and resident of Newton Highlands, county of Middlesex, State of Massachusetts, have invented an Improvement in Shank-Stiffeners, of which the following description, in connection with the accompanying drawing, is a specification, like characters on the drawing representing like parts.

This invention relates to an improvement in shank stiffeners employed in the manufacture of boots and shoes.

In this improved form a reduction is effected in the quantity of material used as contrasted with that employed to form the usual shank stiffener and the resistance of the body portion of the shank stiffener to longitudinal deflection is increased. Furthermore the resilient, reinforcing element of the shank stiffener may be more accurately positioned and liability to displacement prevented while relative longitudinal movement under flexure of the shank stiffener is afforded.

These stiffeners are usually formed of two longitudinally curved members, a flexible body portion and a reinforcing, usually metallic, element. The assembled shank stiffener must possess resiliency to bend under the pressure of the foot upon the shoe shank and must return promptly to normal unstressed position. Obviously, when such a normally curved shank stiffener is bent under pressure, one of the parts must move longitudinally with relation to the surface of the other.

These results are achieved, broadly, by employing a piece of flexible material, such for example as the usual leatherboard, which is less thick than that now commonly employed. This flexible material is cut out to the desired shape to form the body portion of the shank stiffener. It is then suitably molded, rolled or otherwise formed to provide a longitudinal groove or grooves therein.

The under surface is thereby longitudinally expanded or rounded to assume a transverse arch shape and these grooves or depressions cause the total thickness of the body portion to be greater than the thickness of the material from which it is formed. The body portion is then curved longitudinally to impart the necessary curvature and any special bend if desired. The upper surface becomes the convexed side of the stiffener. A resiliently stiff wire is given a longitudinal bend to fit one of the grooves and it is then retained therein by means which prevent displacement yet permit of relative longitudinal movement under flexure of the shank stiffener. Such wire being on the upper, or convexed surface, all pressure tends to force the wire more completely into the body portion and prevents displacement. In narrow shaped shoes, such as women's, a single groove may be employed while in the wider shanks, such as men's, a plurality of these strengthening, transverse-arch-producing grooves may be employed.

The object of this invention is to provide an improved shank stiffener.

Other objects of the invention will more fully appear from the following description and the accompanying drawing and will be pointed out in the annexed claims.

In the accompanying drawings, there has been disclosed a structure designed to carry out the objects of the invention, but it is to be understood that the invention is not confined to the exact features shown, as various changes may be made within its reasonable scope.

Figure 1:
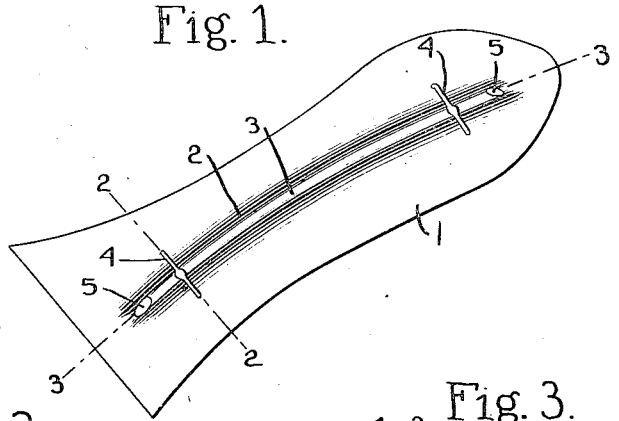
Figure 1 is a perspective view of the improved shank stiffener.

In this selected embodiment of the invention a piece of flexible material, such as leatherboard, is employed. In constructing this improved shank-stiffener, there is employed a thinner piece of material than is customarily used in forming similar shank stiffeners. Such piece of flexible material is cut out to the desired shape so as to form the body portion of the shank stiffener. This body portion is then molded or compressed so as to form one or more longitudinal depressions in the surface which is to be the upper surface of the shank stiffener. Such depression is shown in Fig. 1 wherein the body portion 1 of the shank stiffener has formed therein a longitudinal groove 2. This is conveniently formed by passing the shaped shank stiffener between coöperating grooved rolls. The formation of this groove on the upper side of the body portion causes the under side to be outwardly extended. In the selected embodiment shown this groove 2 is along the medial line of the body portion 1. Hence, the body portion is caused to assume a transversely arched form so that the total thickness of the body portion is greater than the thickness of the material from which it is formed. This compressively formed groove or depression functions to increase the resistance of the body portion to longitudinal deflection. The body portion is then longitudinally curved so that the groove is upon the convexed side.

A resilient reinforcing member is then positioned in the groove. Such a resilient member preferably comprises a stiff, resilient, metal wire 3, (steel being used) of the relative diameter and length shown in Figs. 1 and 2. A longitudinal bend is imparted to this wire 3 to cause it to conform to the curvature of the body portion and therefore closely to fit and be embedded in the groove.

Unlike the common types of reinforcing members, neither the ends of this wire nor the intermediate portion is riveted or otherwise immovably fastened to the body portion. In the present types in which the reinforcing member is fastened to the body portion, the flexure of the shank stiffener resulting from the pressure thereon in walking causes the reinforcing member to break or to become loosened; and, when loosened, its utility is not only destroyed but the body portion of the shank stiffener is injured. In this improved form, retaining means are provided so that longitudinal movement is afforded the resilient member with relation to the body portion.

Figure 2:
Fig. 2 is a section on the line 2—2 of Fig. 1.
Figure 3:
Fig. 3 is a section on the line 3—3, Fig. 1.

Several modes of achieving this result have been illustrated and in Figs. 1 and 2 the preferred form is shown. This consists of the provision of wire staples. These wire staples are preferably two in number and are placed transversely the body portion adjacent the ends of the wire 3. These staples 4 are secured to the body of the stiffener as shown in Fig. 2 and bear upon the upper surface of the wire embedded in the groove. Such a fastening functions to retain the wire 3 in the groove, and coincidentally to permit the wire to move in the groove under the staples. This relative longitudinal movement is set up when pressure is placed upon the shank of the shoe, i.e., longitudinally curved wire tends to assume the position of a straight line and thus to lengthen out. It is this tendency to lengthen out and the resultant bending motion which causes the rigid fastenings in the present common types to pull out, break, to tear and to destroy the adjacent portions of the leather-board and to permit the resilient reinforcing element to become unsecured and to move out of position. Herein, when the shank stiffener is under pressure, the wire tends to become embedded more firmly in the groove and any liability to lateral displacement is overcome. While the resilient wire may move longitudinally in the groove to assume more nearly a straight line, upon removal of the pressure, the stiff resilient wire resumes its normal curved form. The ends 5 of the stiff resilient wire are preferably beveled as shown, to afford a substantially unbroken contour and prevent the ends of the wire from cutting the insole of the shoe.

Figure 7:
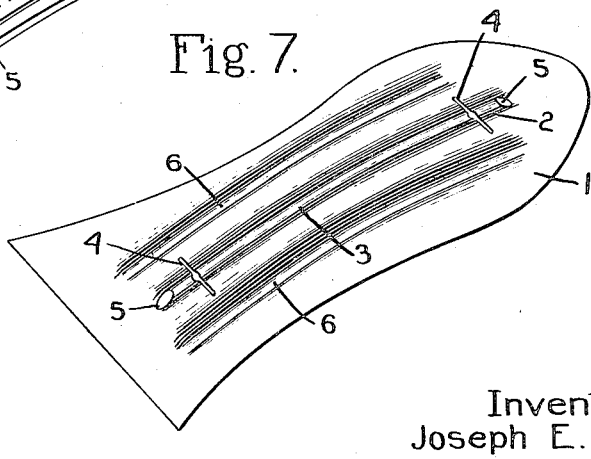
Fig. 7 is a view similar to Fig. 1 and shows a wider shank stiffener having a plurality of depressions.

The form shown in Fig. 1 may be used in the more narrow type of shoes, such as women's. In the employment of this shank stiffener in the wider shanks, such as men's, it has been found advantageous to provide complementary grooves. An example of this form is shown in Fig. 7 wherein a complementary groove 6 is formed on each side of the preferably medial line groove 3. These additional grooves 6 function not only to afford increased resistance of the body portion to longitudinal deflection but also to cause the total thickness of the body portion to be greater than the thickness of the material from which it is formed. In this type, however, it is preferred to employ only one resilient steel wire 3.

Figure 4:
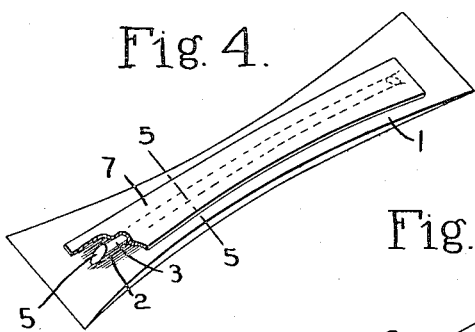
Fig. 4 is a perspective of a modified form.
Figure 5:
Fig. 5 is a section on the line 5—5, Fig. 4.
Figure 6:
Fig. 6 is a sectional view through another modified form.

Other forms are here shown for accomplishing the function of the stapling method which is provided as a means for retaining the wire in the groove so as to permit relative longitudinal movement of the wire therein. In Figs. 4 and 5, the resilient wire is shown as embedded in the groove 2 in the body portion 1, while the retaining means there shown comprises a section of a sheet of fabric or paper 7. This paper 7 is secured to the portion 1 of the shank stiffener by a suitable cement, preferably that kind known as flexible cement. The wire is thereby retained in its groove yet longitudinal movement is permitted it. In the sectional view shown in Fig. 6 the steel wire 3 is shown as positioned in the groove and is embedded in a flexible cement 8 which prevents displacement of the wire yet functions to permit the desired degree of relative longitudinal movement.

There is thus provided a device which effectively stiffens the shank of a boot or shoe, imparts increased resistant strength, and which effects an appreciable saving in material. It can be economically manufactured by combining various steps in its formation, is adaptable to different widths and types of shanks, is durable under working conditions and is not liable to become deranged and thus not only to damage or injure the body portion of the shank stiffener but the adjacent shoe parts as well.

Having thus described my invention what I claim as new and desire to secure by Letters Patent is;

1. A shank stiffener comprising a flexible body portion curved longitudinally to conform to the shank and depressed longitudinally along the medial line of the convex side to form a groove and cause the total thickness of the body portion to be greater than the thickness of the material from which it is formed, a stiff, resilient, metal wire curved longitudinally to conform to the curvature of the body portion and embedded in said groove, and means for retaining the wire in the groove and permitting relative longitudinal movement of the wire and body portion under flexure of the shank stiffener.

2. A shank stiffener comprising a flexible body portion curved longitudinally to conform to the shank and depressed longitudinally along the convex side to form a plurality of grooves and cause the total thickness of the body portion to be greater than the thickness of the material from which it is formed, said grooves also increasing the resistance of the body portion to longitudinal deflection, a stiff, resilient, metal wire curved longitudinally to conform to the curvature of the body portion and embedded in one of said grooves, and means for retaining the wire in the said groove and permitting relative longitudinal movement of the wire and body portion under flexure of the shank stiffener.

3. A shank stiffener comprising a flexible body portion curved longitudinally to conform to the shank and depressed longitudinally along the convex side to form a groove and cause the total thickness of the body portion to be greater than the thickness of the material from which it is formed, a stiff, resilient metal wire curved longitudinally to conform to the curvature of the body portion and embedded in said groove, and staples secured to said body portion transversely said wire to retain the wire in the groove and permit relative longitudinal movement of the wire and body portion under flexure of the shank stiffener.

4. In a shank stiffener the combination of a body portion longitudinally grooved, a resilient element positioned in the groove, and means to retain said element in the groove so that relative longitudinal movement may be afforded the element therein.

5. In a shank stiffener, the combination of a body portion longitudinally grooved, a resilient element positioned in the groove, and members secured on said body portion extending transversely of said groove to retain said element in the groove so as to permit relative longitudinal movement of the element in the groove.

In testimony whereof, I have signed my name to this specification.

JOSEPH E. PECKHAM.